US010660253B2

(12) United States Patent
Lee et al.

(10) Patent No.: US 10,660,253 B2
(45) Date of Patent: May 26, 2020

(54) TWIN SHAFT SYSTEM FOR GARDENING SYSTEMS

(71) Applicants: Kai S. Lee, Portage, MI (US); Esther Lee, Portage, MI (US)

(72) Inventors: Kai S. Lee, Portage, MI (US); Esther Lee, Portage, MI (US)

(*) Notice: Subject to any disclaimer, the term of this patent is extended or adjusted under 35 U.S.C. 154(b) by 327 days.

(21) Appl. No.: 15/461,995

(22) Filed: Mar. 17, 2017

(65) Prior Publication Data

US 2017/0265372 A1 Sep. 21, 2017

Related U.S. Application Data

(60) Provisional application No. 62/390,035, filed on Mar. 17, 2016, provisional application No. 62/390,351, filed on Mar. 28, 2016.

(51) Int. Cl.
*A01B 33/02* (2006.01)
*A01B 33/08* (2006.01)

(52) U.S. Cl.
CPC .......... *A01B 33/082* (2013.01); *A01B 33/028* (2013.01)

(58) Field of Classification Search
CPC ..... A01B 33/028; A01B 33/082; A01B 33/08; A01B 33/065; A01B 33/06; A01B 33/085; A01B 33/106; A01B 35/02; A01B 35/26; F16D 13/08; F16D 13/12; F16D 27/105
USPC ...... 172/42–49, 59, 110, 111, 125, 142, 156, 172/176; 74/11, 15.6, 355, 377, 532, 74/551, 849
See application file for complete search history.

(56) References Cited

U.S. PATENT DOCUMENTS

| | | | |
|---|---|---|---|
| 870,665 A | 11/1907 | Colgren | |
| 1,240,542 A | 9/1917 | Cassell | |
| 1,533,626 A | 4/1925 | Wilson et al. | |
| 2,438,189 A * | 3/1948 | Seaman | A01B 33/142 172/103 |
| 2,513,186 A | 6/1950 | Leaman | |
| 2,612,094 A | 9/1952 | Drozinski | |
| 2,883,182 A * | 4/1959 | Bornemann | E05F 15/40 74/89.23 |
| 3,302,762 A * | 2/1967 | Conlon | F16D 13/08 192/41 R |
| 4,018,105 A | 4/1977 | Walker | |
| 4,402,366 A | 9/1983 | Dankel | |
| 4,452,316 A | 6/1984 | Edwards | |
| 4,481,757 A | 11/1984 | Tsuchiya | |

(Continued)

*Primary Examiner* — Robert E Pezzuto
(74) *Attorney, Agent, or Firm* — Price Heneveld LLP

(57) ABSTRACT

A counter-rotating twin shaft gardening system is provided herein. The gardening system includes a drive shaft operably coupled to first and second shafts for driving the first shaft in the first direction and the second shaft in the second direction. A first ground manipulation device is attached to the first shaft. A second ground manipulation device is attached to the second shaft. The first and second ground manipulation devices including a plurality of teeth and a plurality of long arms. The plurality arms extend further outward from a planar portion than the plurality of teeth. A release system is disposed within the drive shaft to reduce or reverse the rotation of the first and second shafts when debris is disposed between the first and second ground manipulation devices. The release system is formed from a first portion and a second portion of the drive shaft.

23 Claims, 9 Drawing Sheets

(56) References Cited

U.S. PATENT DOCUMENTS

| | | |
|---|---|---|
| 4,483,400 A | 11/1984 | Arndt |
| 4,519,459 A | 5/1985 | Reaume |
| 4,620,599 A | 11/1986 | Zinck |
| 4,754,660 A | 7/1988 | Kobayashi et al. |
| 4,905,460 A | 3/1990 | Toman |
| 4,979,573 A | 12/1990 | Williamson |
| 5,048,617 A | 9/1991 | Haven |
| 5,101,911 A | 4/1992 | Lee et al. |
| 5,224,552 A | 7/1993 | Lee et al. |
| 5,353,881 A | 10/1994 | Lee et al. |
| 5,520,253 A * | 5/1996 | Kesting ............... A01B 33/027 172/125 |
| 5,570,923 A * | 11/1996 | Taylor ..................... B60S 1/34 15/250.04 |
| 6,144,177 A * | 11/2000 | Mao ....................... A47H 5/03 160/331 |
| 6,488,101 B1 | 12/2002 | Miyahara et al. |
| 6,926,091 B2 | 8/2005 | Lee |
| 7,198,114 B2 | 4/2007 | Simon et al. |
| 7,878,260 B2 | 2/2011 | Notaras et al. |
| 8,047,938 B2 | 11/2011 | Sakai |
| 8,162,072 B2 | 4/2012 | Marcil et al. |
| 8,201,638 B1 | 6/2012 | Badger et al. |
| 8,434,563 B2 | 5/2013 | Gendelman et al. |
| 8,496,069 B2 | 7/2013 | Gendelman et al. |
| 8,607,889 B2 | 12/2013 | Marcil et al. |
| 8,627,897 B2 | 1/2014 | Marcil et al. |
| 9,167,737 B2 | 10/2015 | McGowen |
| 9,277,687 B2 | 3/2016 | Mardi et al. |
| 9,924,622 B2 * | 3/2018 | Maggard ............... A01B 33/028 |
| 2003/0221399 A1 | 12/2003 | Hall |
| 2006/0011357 A1 | 1/2006 | Casey et al. |
| 2006/0070749 A1 | 4/2006 | Simon et al. |
| 2008/0202091 A1 | 8/2008 | Bundy |
| 2010/0326033 A1 | 12/2010 | Esmoris Bertoa |
| 2015/0271983 A1 | 10/2015 | Bos |

* cited by examiner

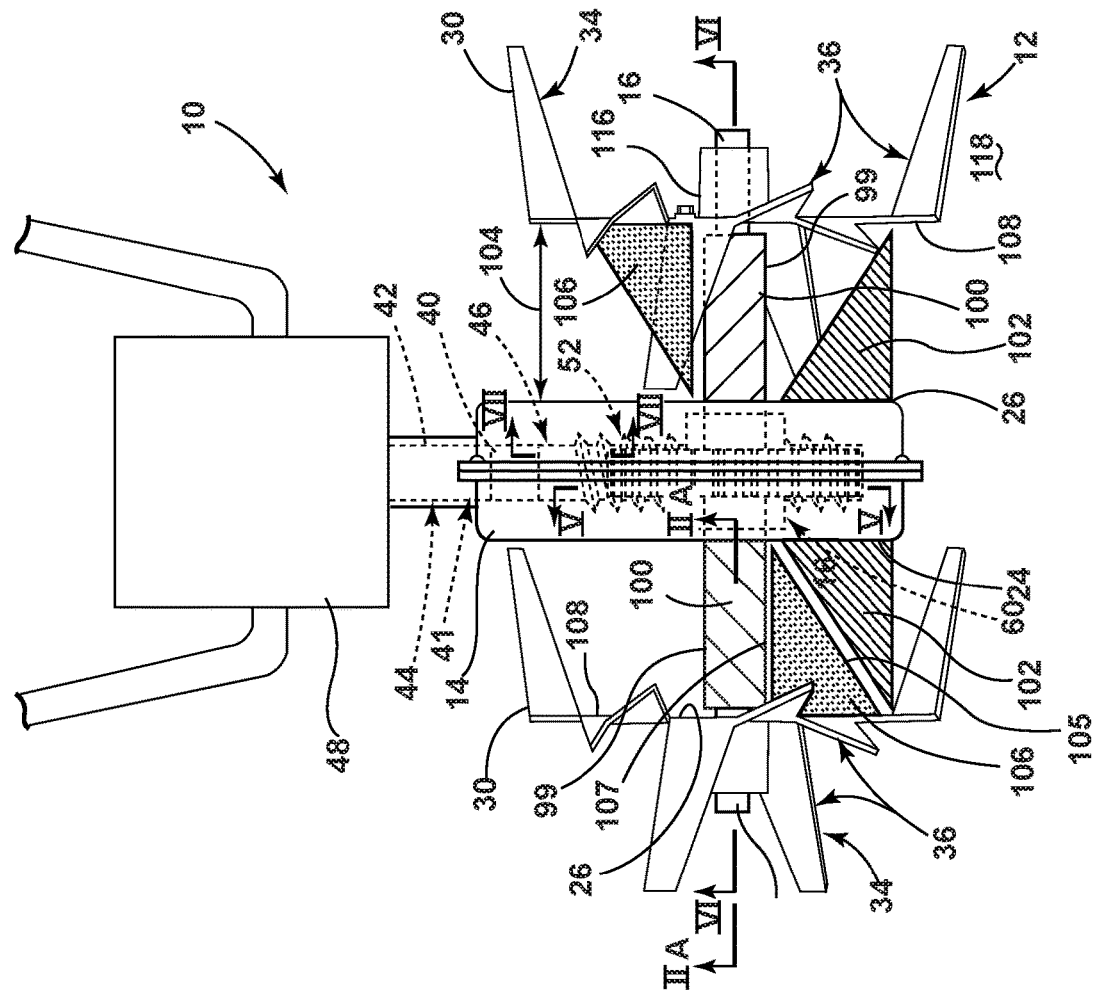
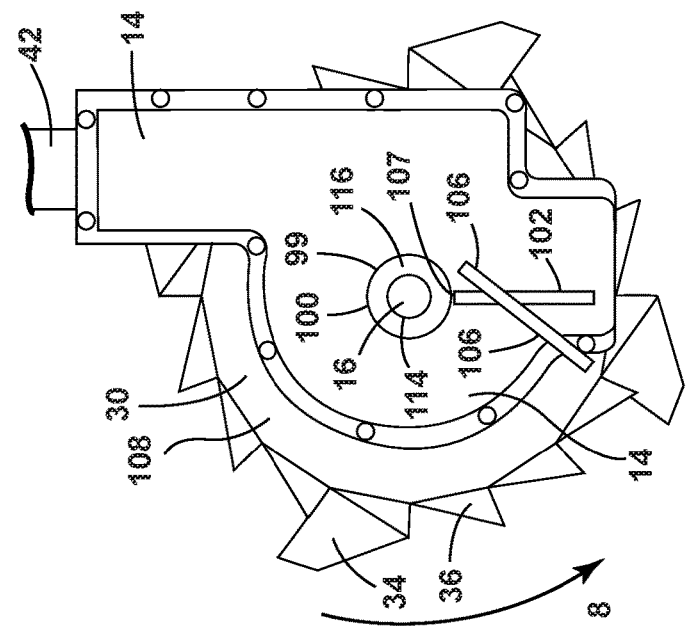
FIG. 2
FIG. 2A

TWIN SHAFT SYSTEM FOR GARDENING SYSTEMS

CROSS-REFERENCE TO RELATED APPLICATIONS

This application claims benefit from U.S. Provisional Patent Application No. 62/390,035, which was filed on Mar. 17, 2016, entitled "WORM-GEAR ANTI-LOCKING SYSTEM," and U.S. Provisional Patent Application No. 62/390,351, which was filed on Mar. 28, 2016, entitled "FAST PENETRATING TILLING TINE WITH WEED SHREDDING BLADES," the entire disclosures of which are incorporated herein by reference.

FIELD OF THE INVENTION

The present invention generally relates to a garden/landscaping utility system, and more particularly to a garden/landscaping utility system that includes a counter-rotating twin shaft system.

BACKGROUND OF THE INVENTION

Conventional rototillers used for tilling soil and cultivating in gardening or agricultural work characteristically have a single shaft with a plurality of tines affixed thereto. While conventional rotor tillers utilizing a single shaft may do an adequate job of tilling previously tilled soils or light soils, conventional tillers do not perform as well in hard soils, soils containing rocks and other debris, and/or soils containing a significant amount of dense, tall weeds therein. These hard soils, rocky soils, etc., require an increase in the downward force exerted on the tiller by the operator in order to cause the tines to enter the ground. Additionally, the conventional tiller will typically "walk" over these hard soils and skip areas, resulting in uneven tilling of the ground and/or tilling to a very shallow depth. Accordingly, it is therefore desired to implement a more robustly designed gardening system.

SUMMARY OF THE INVENTION

According to one aspect of the present disclosure, a gardening system is disclosed that includes a frame. A first shaft is mounted within the frame for rotation in a first direction. A second shaft is mounted within the frame for rotation in a second direction, which is opposite to the first direction. A drive system is operably coupled to the first and second shafts for driving the first shaft in the first direction and the second shaft in the second direction. A first ground manipulation device is attached to the first shaft. The first ground manipulation device has a planar section extending substantially perpendicular to the first shaft and an outer engaging edge having a plurality of irregularities. A second ground manipulation device is attached to the second shaft. The second ground manipulation device has a planar section extending substantially perpendicular to the second shaft and an outer engaging edge having a plurality of irregularities. A release system is disposed within the drive system to reduce or reverse the rotation of the first and second shafts when debris is disposed between the first and second ground manipulation devices.

According to another aspect of the present disclosure, a gardening system is disclosed that includes a drive system operably coupled to first and second shafts for driving the first shaft in a first direction and the second shaft in a second direction. A first ground manipulation device is attached to the first shaft. A second ground manipulation device is attached to the second shaft. A release system is disposed within the drive system to reduce or reverse a rotation of the first and second shafts. The release system is formed from a first portion and a second portion of the drive system. A chamber is defined by the second portion. A pin is disposed on a bottom portion of the first portion of the drive system. The pin has a length that is less than a width of the chamber. A corresponding recession slot is disposed in the second portion of the drive system. The pin and slot engage one another to rotate the first and second portions of the drive system simultaneously.

According to yet another aspect of the present disclosure, a gardening system is disclosed that includes a drive shaft operably coupled to first and second shafts for driving the first shaft in a first direction and the second shaft in a second direction. A first ground manipulation device is attached to the first shaft. A second ground manipulation device is attached to the second shaft. The first and second ground manipulation devices include a plurality of teeth and a plurality of long arms, the plurality arms extending further outward from a planar portion than the plurality of teeth. A release system is disposed within the drive shaft to reduce or reverse a rotation of the first and second shafts. The release system is formed from a first portion and a second portion of the drive shaft.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a front perspective view of the gardening system having a release system, according to various embodiments, and a pair of shearing blades disposed on a frame and on the ground manipulation device, respectively;

FIG. 2A is a cross-sectional view of the gardening system taken along the line IIA-IIA of FIG. 2;

DETAILED DESCRIPTION OF THE PREFERRED EMBODIMENTS

Figure 1:
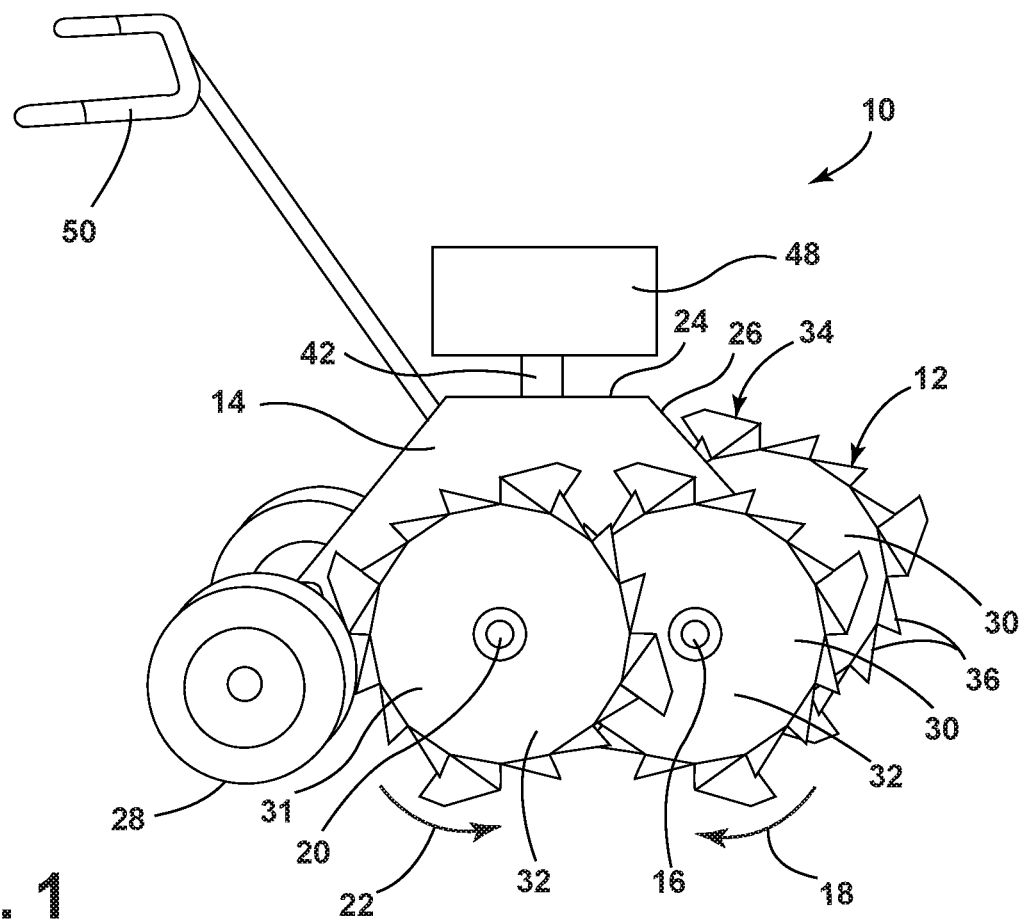
FIG. 1 is a side perspective view of a gardening system having a pair of ground manipulation devices, according to various embodiments.
Figure 1A:
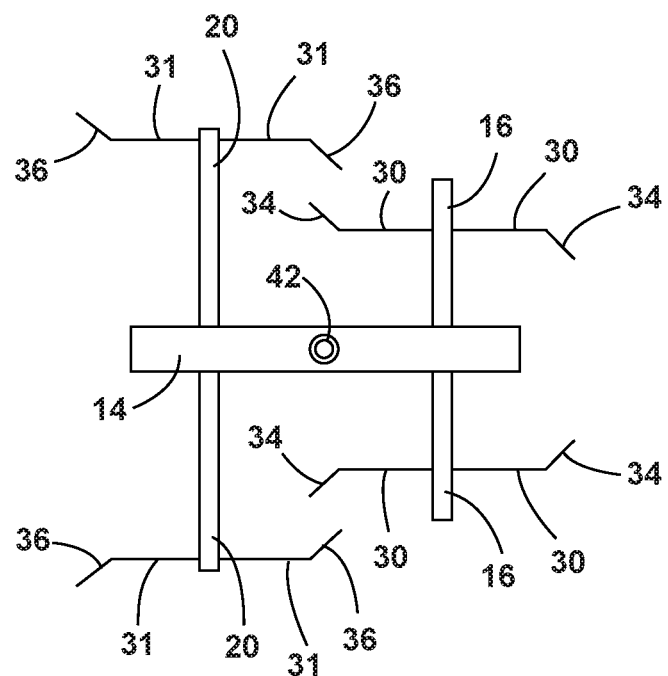
FIG. 1A is a top-down-view of the working assembly, according to various embodiments.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a gardening system. In various embodiments, the gardening system utilizes a ground manipulation device that may carry a weed shearing blade and a release system to release the torque on the ground manipulation device when a rock or other form of debris is caught within the gardening system. The release system may be disposed within a drive shaft and/or on one or more ground manipulation device shafts.

Referring to FIGS. 1-11, a gardening system 10 includes a working assembly 12 supported by a transmission box or frame 14. A first shaft 16 is mounted within the frame 14 for rotation in a first direction as indicated by an arrow 18 (FIG. 1), and a second shaft 20 mounted within frame 14 for rotation in a second direction as indicated by an arrow 22 (FIG. 1), and which is opposite to first direction 18. However, in various embodiments, the first and second shafts 16, 20 may rotate in a common direction. The first shaft 16 and the second shaft 20 are mounted transversely through sidewalls 24 and 26 of the frame 14 and are substantially perpendicular to the normal direction of travel during operation of the gardening system 10. The frame 14 is also supported above the ground by a pair of wheels 28.

The working assembly 12 further includes two ground manipulation devices 30, 31 removably attached to the first shaft 16 and the second shaft 20, respectively. Each ground manipulation device 30, 31 has a planar section 32 that extends substantially perpendicular to the first and second shafts 16, 20, and an outer engaging edge 34 having a plurality of irregularities 36 spaced there along. Each ground manipulation device 30, 31 is removably fixed to its respective shaft 16, 20 by any method known in the art, such as through the usage of fasteners 122. Moreover, it will be appreciated that the ground manipulation device 30, 31 may take any shape and may be used for any function, including but not limited to, tilling, shearing, and/or cutting, without departing from the scope of the present disclosure.

Referring again to FIGS. 1 and 2, according to various embodiments, the gardening system 10 also includes a drive system 41 that is operably coupled with an engine 48 and the first shaft 16, the second shaft 20, and/or a device (e.g. a gear 54 (FIG. 3) or a pulley system) for rotating the first and/or second shafts 16, 20. For example, according to various embodiments, a drive shaft 42 is disposed within the drive system 41 and includes a first portion 44 and a second portion 46. The first portion 44 of the drive shaft 42 is coupled to an engine 48. The second portion 46 may be disposed, at least partially, within the frame 14 and may operably couple with the first and second shafts 16, 20. Due to counter-rotating action of the ground manipulation devices 30, 31, a rock, debris 38 (FIG. 6), and/or other hard matter may be caught between the ground manipulation devices 30, 31. Accordingly, a release system 40 may be disposed within the gardening system 10. The release system 40 may be disposed within the drive shaft 42 and/or within the first and second counter-rotating shafts 16, 20. The release system 40 is configured to reduce and/or eliminate the torque (or rotation) of the first and second ground manipulation devices 30, 31 when rotation is inhibited above a predetermined level. The inhibited rotation may be caused by the debris 38 (FIG. 6) disposed between the first and second ground manipulation devices 30, 31. It will be appreciated that the release system may be disposed within any portion of the drive system 41 without departing from the teachings provided herein. Accordingly, any shaft within the gardening system 10 may include the first and second portions 44, 46 and form the release system 40.

Referring still to FIGS. 1 and 2, the gardening system 10 further includes a handle 50 extending rearwardly of the engine 48. Because of the unique counter-rotational ground manipulation devices 30, 31, the handle 50 may perform as least four functions normally requiring complex transmissions, including stationary tilling, self-propelled forward or backward tilling, and control of the tilling depth and the speed of machine travel. The at least four functions can be readily obtained and by simply adjusting the height of the handle 50 with respect to the ground. Stationary tilling may be accomplished when the machine is leveled with respect to the ground by leveling handle 50. If the rear end of the machine is tilted upwards by placing an upward pressure on handle 50, the weight of the machine is shifted forward along the ground manipulation devices 30, 31 to dig or shear deeper at a front portion of the gardening system 10 into a ground soil 118 causing the machine to move forward faster. Likewise, if the rear of the machine is lowered by placing the downward force upon the handle 50, the machine will move in a controlled manner in a rearward direction. The depth of tilling and the speed of the forward or rearward movements of the gardening system 10 can be readily and quickly changed by the amount of upward or downward force exerted upon the handle 50.

Referring to FIGS. 2 and 2A, the first and second shafts 16, 20 may further include a central rib 100 spiraling outwardly from the frame 14. In operation, the rib 100 clears intertwining vegetation and the like from the first and second shafts 16, 20. Additionally, a first shearing blade 102 is fixedly attached to and extends outwardly from the sidewalls 24 and 26 of the frame 14. The first shearing blade 102 is positioned and configured to extend along a gap 104 between the frame 14 and the ground manipulation devices 30, 31 and, during operation, prevents the intertwining of vegetation and debris from entering the gap 104. A second shearing blade 106 is coupled to an inner surface 108 of the ground manipulation devices 30, 31. According to various embodiments, the first and second shearing blades 102, 106 may have a triangular geometry; however, it will be appreciated that the first and second shearing blades 102, 106 may be of any practicable geometry without departing from the teachings provided herein.

According to various embodiments, the shearing blade 102 may extend transversely from the frame 14 or at an angle therefrom. Likewise, the second triangular shearing blade 106 may extend transversely from the ground manipulation device 30, 31 or at an angle therefrom. Once the first and second shearing blades 102, 106 are fixed to the frame 14 and the ground manipulation devices 30, 31, respectively, the second shearing blade 106 may rotate above the first shearing blade 102. As the ground manipulations devices 30, 31 rotate on the first and second shafts 16, 20, the second shearing blade 106 will rotate with the ground manipulations devices 30, 31.

Furthermore, in embodiments in which the first and second shearing blades 102, 106 are triangular, the hypotenuse edge of the second triangular shearing blade 106 while rotating will come in close proximity to the hypotenuse edge of the first shearing blades 102 to form a diagonal gap 105, thereby shearing any weeds/debris 38 caught in between the diagonal space between the first and second shearing blades 102, 106. The narrower the space, the better the shearing/shredding action by the opposing first and second shearing blades 102, 106. In addition, as the ground manipulation devices 30, 31 rotate, the base 107 of the second shearing blade 106 will revolve around the stationary hub 99 housing the shafts 16, 20, thereby removing any tangling debris. Thus, the first and second shearing blades 102, 106 may act like a pair of scissors for shearing. In this arrangement, the weed and debris 38 that wrap around the first and second shafts 16, 20 and the weed, debris 38, clay jams that formed between the ground manipulation devices 30, 31 and the frame 14 will be cleared continuously as the ground manipulation devices 30, 31 rotate. Moreover, the second shearing blades 106 rotate around the first and second shafts 16, 20 as the ground manipulation devices 30, 31 rotate. Accordingly, the second shearing blades 106 may remove debris 38 from the first and second shafts 16, 20.

Figure 3:
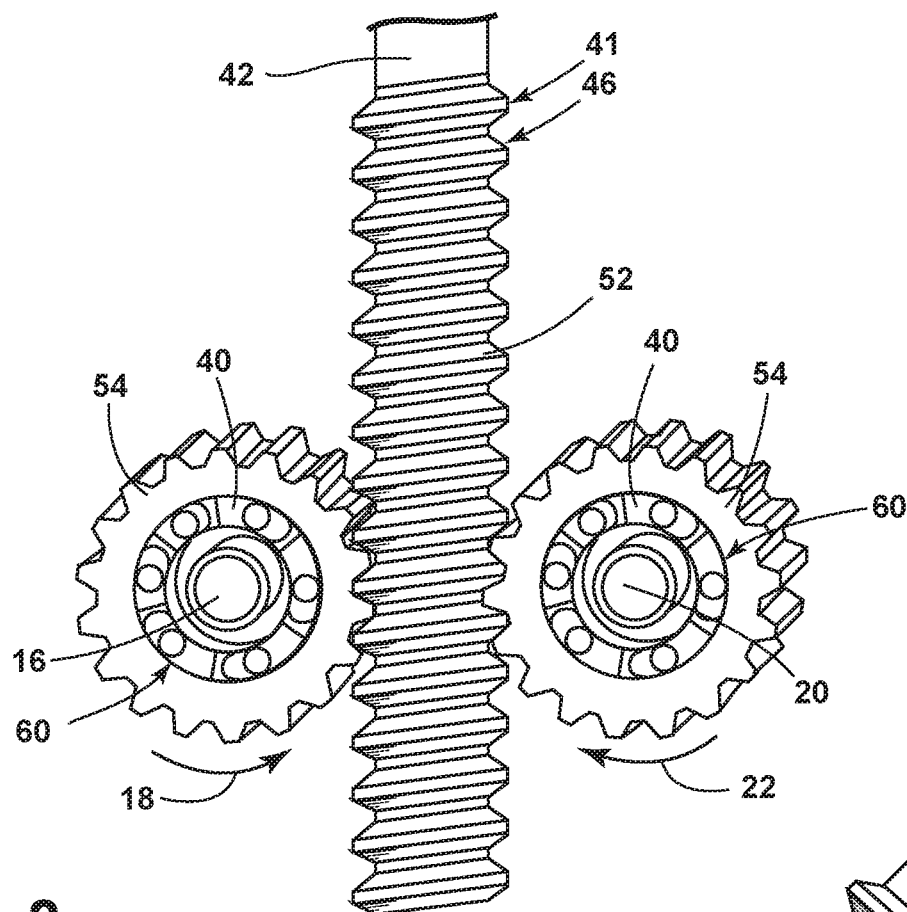
FIG. 3 illustrates a worm portion of a drive shaft that is configured to drive a pair of worm gears in opposing directions, according to various embodiments.
Figure 4:
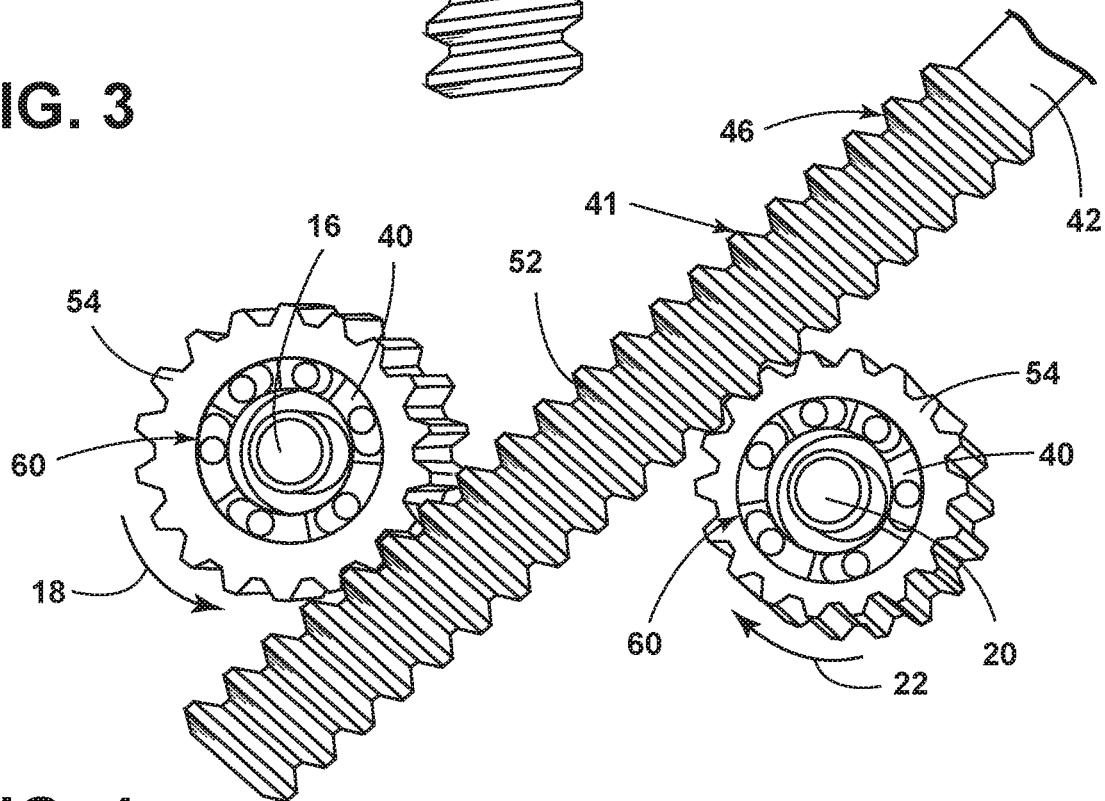
FIG. 4 illustrates the worm portion of the drive shaft that is configured to drive a pair of offset worm gears in opposing directions, according to various embodiments.

Referring to FIGS. 2-4, the second portion 46 of the drive shaft 42 includes a worm portion 52 that engages with worm gears 54 provided on the first and second shafts 16, 20 to transmit power to each of the first and second shafts 16, 20, and effect counter-rotation thereof. The drive shaft 42 can be provided in either a vertical orientation, as shown in FIG. 3, or an inclined orientation, as shown in FIG. 4, to effect the driving of the worm gears 54. In the illustrated example of FIG. 4, the worm portion 52 of the drive shaft 42 and the worm gear 54 may allow a nearly 50 to 1 reduction of the rotation speed of drive shaft 42 to shafts 16 and 20, thereby allowing the use of the engine 48 operating at speeds of nearly 7,000 RPM.

Figure 5:
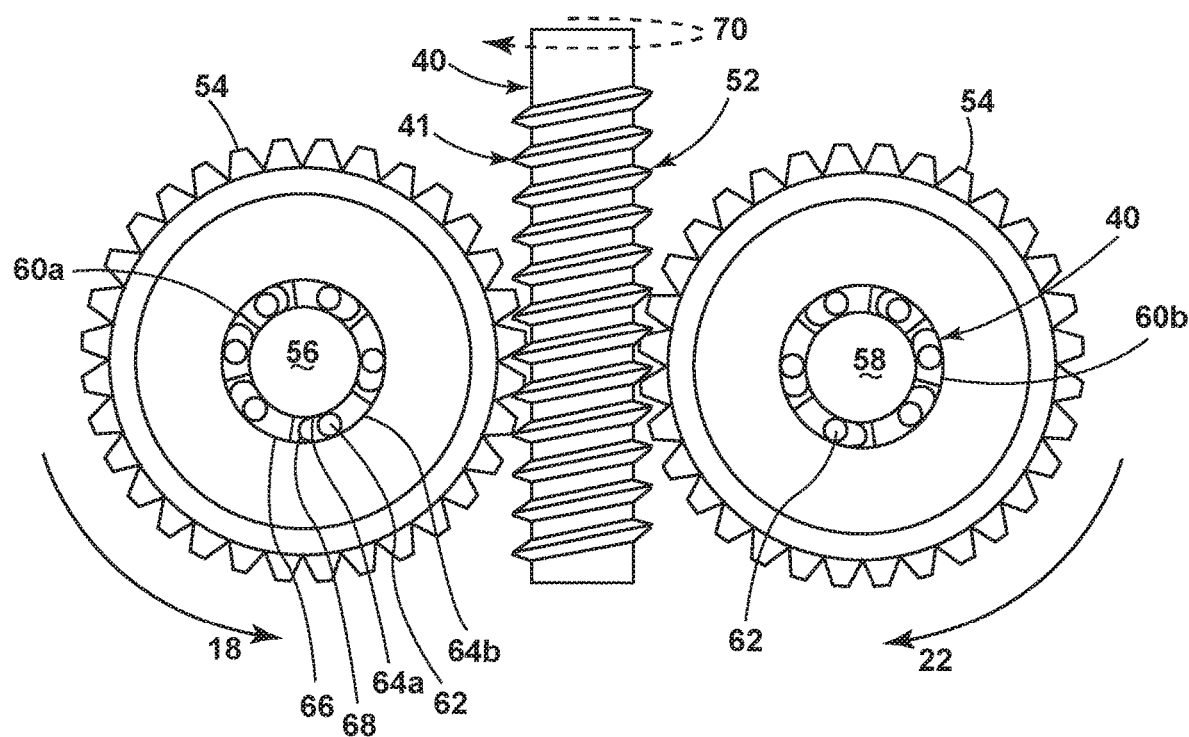
FIG. 5 is a cross-sectional view of the worm portion of the drive shaft and the worm gears taken along the line V-V of FIG. 2 having a release system disposed within each worm gear, according to various embodiments.
Figure 6:
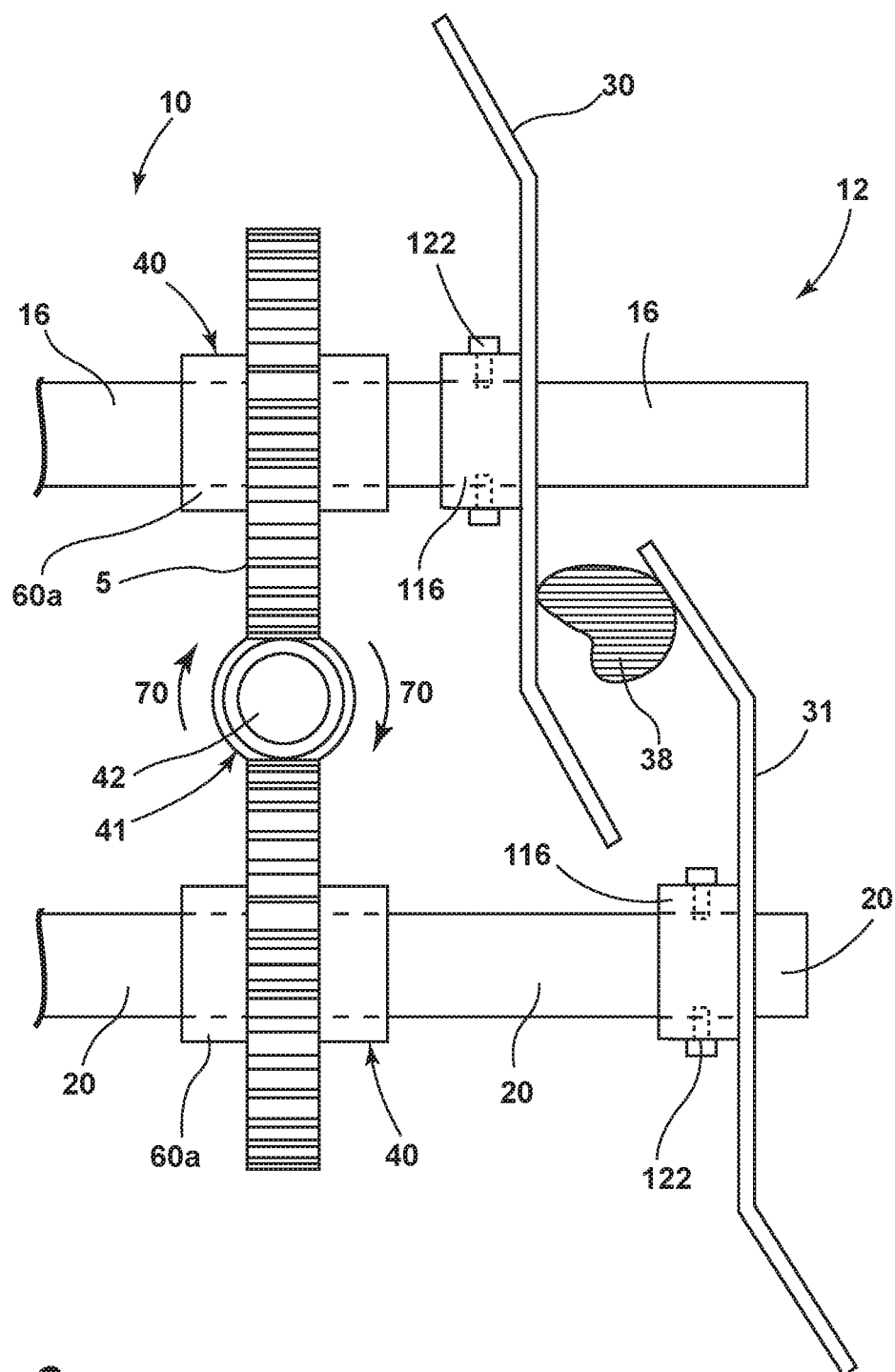
FIG. 6 is a cross-sectional view of the worm portion of the drive shaft and the worm gears taken along the line VI-VI of FIG. 2 having the release system disposed within each worm gear and debris disposed between a pair of ground manipulation devices, according to various embodiments.
Figure 7:
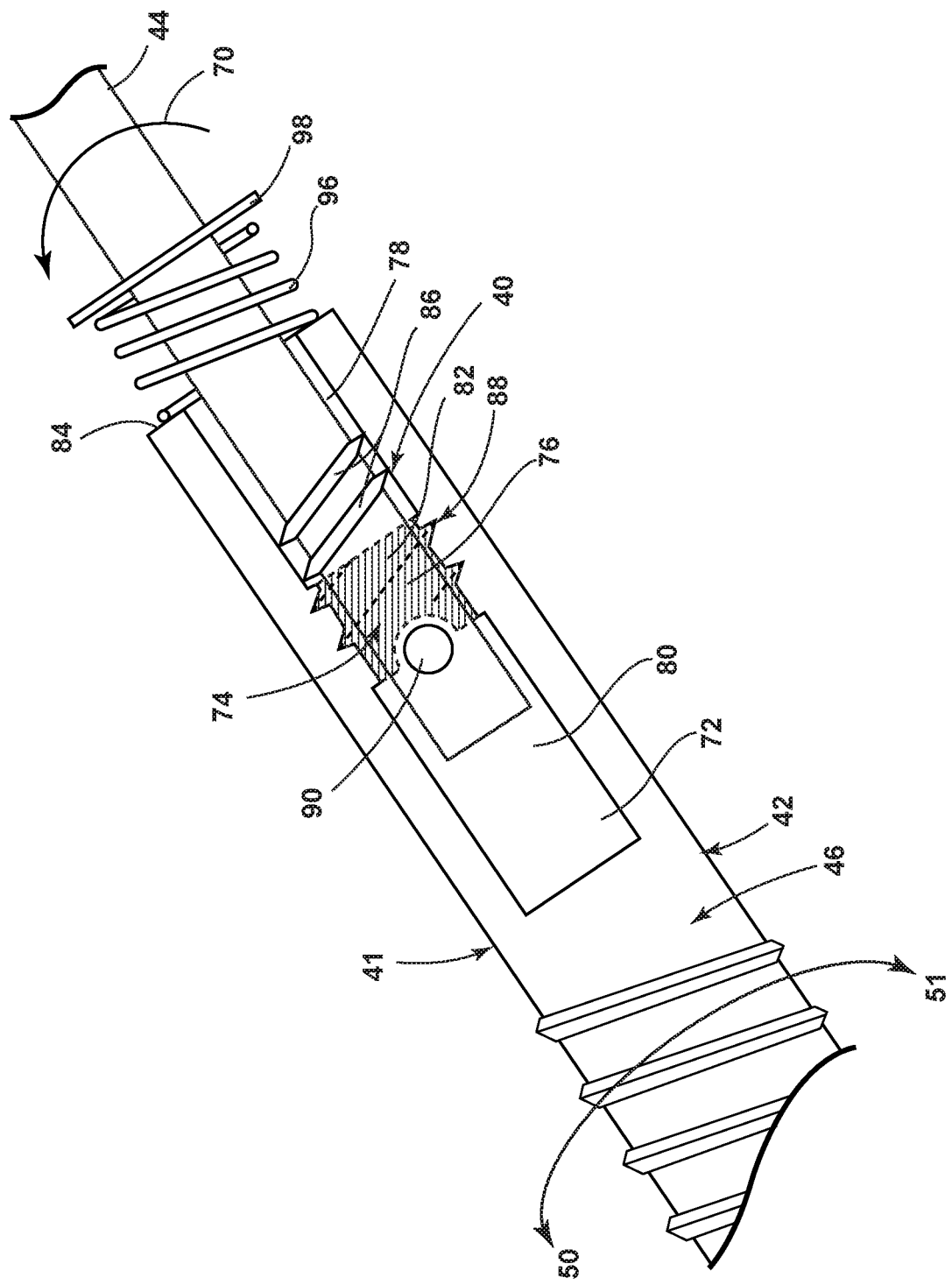
FIG. 7 is a cross-sectional view of the release system disposed within the drive shaft of the gardening system taken along the line VII-VII of FIG. 2, according to various embodiments.
Figure 8A:
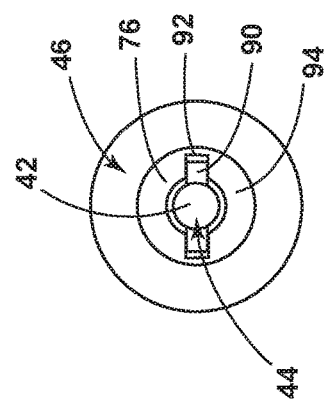
FIG. 8A is a cross-sectional view taken along the line VIIIA-VIIIA of FIG. 8 illustrating the pin on the first portion disposed within the slot of the second portion of the drive shaft, according to various embodiments.
Figure 8:
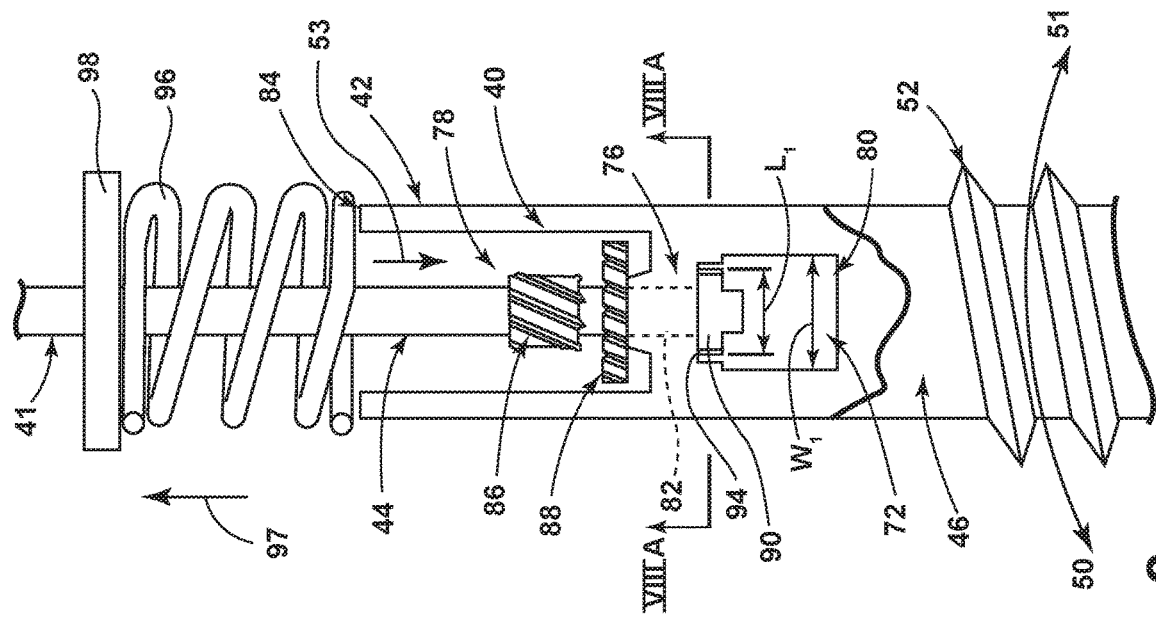
FIG. 8 is a cross-sectional view of the release system disposed within the drive shaft of the gardening system taken along the line VII-VII of FIG. 2 with a pin on a first portion of the drive shaft engaged with a slot on a second portion of the drive shaft, according to various embodiments.
Figure 9A:
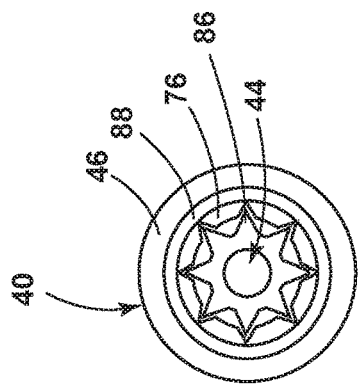
FIG. 9A is a cross-sectional view taken along the line IXA-IXA of FIG. 9 illustrating the first threaded portion on the first portion of the drive shaft engaged with the second threaded portion on the second portion of the drive shaft, according to various embodiments.
Figure 9:
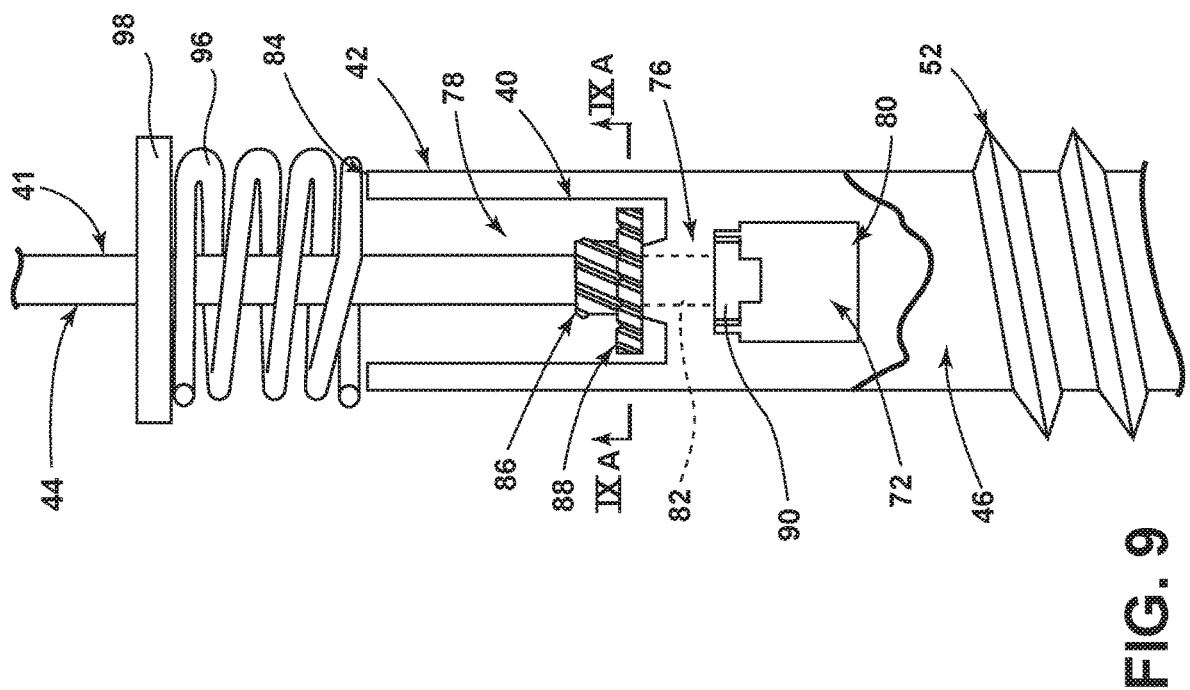
FIG. 9 is a is a cross-sectional view of the release system disposed within the drive shaft of the gardening system taken along the line VII-VII of FIG. 2 having the release system disposed within the drive shaft with a first threaded portion on the first portion of the drive shaft engaged with a second threaded portion on the second portion of the drive shaft, according to various embodiments.

Referring to FIGS. 5 and 6, the first and second shafts 16, 20 may be disposed through a centrally defined aperture 56, 58 within the worm gears 54. A pair of bearing 60a, 60b may be disposed between each shaft 16, 20 and each worm gear 54 center bore, and function as the release system 40. According to various embodiments, the bearing 60a, 60b may be configured as a roller needle bearing that allows single directional rotation (slip or lock). In such embodiments, needle rollers 62 are housed within inner and outer races 64a, 64b that are separated by stationary partitions 66 running the length of the needle rollers 62. The partitions 66 have friction surfaces 68 facing one side of the roller. As the rollers 62 are pushed against the friction surface 68 on the partitions 66, the rollers 62 in the bearing 60a, 60b are locked, and the bearing 60a, 60b will not rotate on its inner and outer races 64a, 64b. The first and second shafts 16, 20 are fitted on the inner race 64a through the apertures 56, 58 and rotate as the bearing 60a, 60b rotates 70.

However, if the shaft 16, 20 encounters rotational resistance, such as when debris 38 is disposed between the ground manipulation devices 30 in FIG. 6, the needle rollers 62 will roll away from the frictional surfaces (i.e., slip) and the shaft 16, 20 can rotate independently of the bearing 60a, 60b. Therefore, when the single direction needle bearing 60a, 60b carrying a shaft 16, 20 through the apertures 56, 58 is mounted on a worm gear 54, the bearing 60a, 60b and each shaft 16, 20 will rotate in unison with the worm gear 54 in a lock position. When the shaft 16, 20 encounters strong rotational resistance, the bearing 60a, 60b will switch to its slip position, thus freeing the shaft 16, 20 from the rotation of the worm gear 54. In a tiller, during normal ground manipulation device 30, 31 rotation, the bearing 60a, 60b is in the lock position. When the ground manipulation device 30, 31 rotation is stopped by debris 38, the bearing 60a, 60b will switch to the slip position to reduce the rotation of the first and second shafts 16, 20 when debris 38 is disposed between the first and second ground manipulation devices 30, 31 and/or stop the rotation of the ground manipulation devices 30, 31, thus, releasing the lock/jam caused by the rock and/or other debris 38.

According to various embodiments, the lock position of the first bearing 60a is counter-clockwise 18 (FIG. 1) while the second bearing 60b is clockwise 22 (FIG. 1). The ground manipulation devices 30, 31 are mounted on the first and second shafts 16, 20 for counter-rotation thereof. If debris 38 is caught between the ground manipulation devices 30, 31, the bearing 60a, 60b will slip from the original locking or digging positions to loosen the grip of the ground manipulation devices 30, 31 on the debris 38, to passively allow the debris 38 to fall out from between the ground manipulation devices 30, 31.

Referring to FIGS. 7-9A, according to various embodiments, the release system 40 may alternative, and/or additionally, be disposed within the drive shaft 42. In such embodiments, the worm portion 52 defines a chamber 72. The release system 40 may be disposed above the worm portion 52. A midsection 74 of the chamber 72 includes a partition 76 that divides the chamber 72 into an upper chamber 78 and a lower chamber 80. The partition 76 defines a hole 82. The first portion 44 of the drive shaft 42 is inserted from a top section 84 into the upper chamber 78, through the partition hole 82, and into the lower chamber 80. The first portion 44 of the drive shaft 42 also includes a first threaded portion 86 that includes male screw threads. The first threaded portion 86 correlates with a second threaded portion 88, which may have female screw threads on the partition 76.

The first portion 44 of the drive shaft 42 may also be disposed within the lower chamber 80 and include a pin 90. The pin 90 may be transversely disposed to the first portion 44 of the drive shaft 42. The pin 90 has a length $L_1$ that is less than the width $W_1$ of the lower chamber 80 so the first portion 44 of the drive shaft 42 can freely turn within the lower chamber 80. The pin 90 may reversibly fit into a corresponding recession slot 92 in a lower section 94 of the partition 76.

Referring still to FIGS. 7-9A, a compression spring 96 is disposed between a spring retainer 98 and the top section 84 of the second portion 46 of the drive shaft 42. The spring 96 exerts an upward force 97 between the first and second portions 44, 46 of the drive shaft 42 so that the pin 90 is engaged within the recession slot 92. Together, the pin 90 and the recession slot 92 join the first and second portions 44, 46 of the drive shaft 42 during normal running loads so that the first and second portions 44, 46 of the drive shaft 42 rotate in unison.

During normal running loads, the pin 90 is engaged with the recession slot 92 by the compression of spring 96. Thus, clockwise turning 70 of the first portion 44 of the drive shaft 42 causes clockwise turning 50 of the worm portion 52. If the clockwise turning 50 of the worm portion 52 suddenly meets strong turning resistance, the turning of the second portion 46 of the drive shaft 42 will be slowed or stopped while the first portion 44 of the drive shaft 42, which is driven by the engine 48, remains at a constant speed with the engine 48. When the ground manipulation devices 30, 31 are restricted from rotating above a predefined torque level, the first portion 44 of the drive shaft 42 may be pressed downwards 53 to overcome the spring's 96 resistance and towards the chamber 72. The downward force 53 on the first portion 44 of the drive shaft 42 by the constant engine 48 force will decouple the pin 90 from its corresponding recession slot 92. The downward force 53 will also place the first threaded portion 86 of the first portion 44 of the drive shaft 42 into the corresponding second threaded portion 88. Since the threads in first and second threaded portions 86, 88 are in a reverse direction, the clockwise turning of the first portion 44 of the drive shaft 42 will effect a counter-clockwise turn 51 of the second portion 46 of the drive shaft 42, as long as the drive shaft 44 is being pushed down 53 by the engine's 48 force.

Upon release of the strong turning resistance on the second portion 46 when rocks/debris drop off from the garden system 10, the spring 96 will pull the first portion 44 of drive shaft 42 back up again for the pin 90 and the recession slot 92 to engage, thus restoring normal second portion 46 of the drive shaft 42 clockwise turns 50. For rapid engagement and disengagement, the first and second threaded portions 86, 88 may include threads that are short and more vertically included. For instance, the threads may be at an offset angle greater than 40 degrees from the latitudinal line that is transverse to the longitudinal axis of the drive shaft 42. Therefore, at a constant engine speed the drive shaft 42 can turn clockwise 50 or counter-clockwise 51 automatically, depending on the turning resistance experienced by the second portion 46. Such automatic drive shaft 42 reversals can happen repeatedly without having to change the speed of the running engine 48, thus saving time. For longer worm portion 52 reversal turns, simply hold down the first portion 44 of the drive shaft 42 manually by the handle 50, for example.

Figure 11:
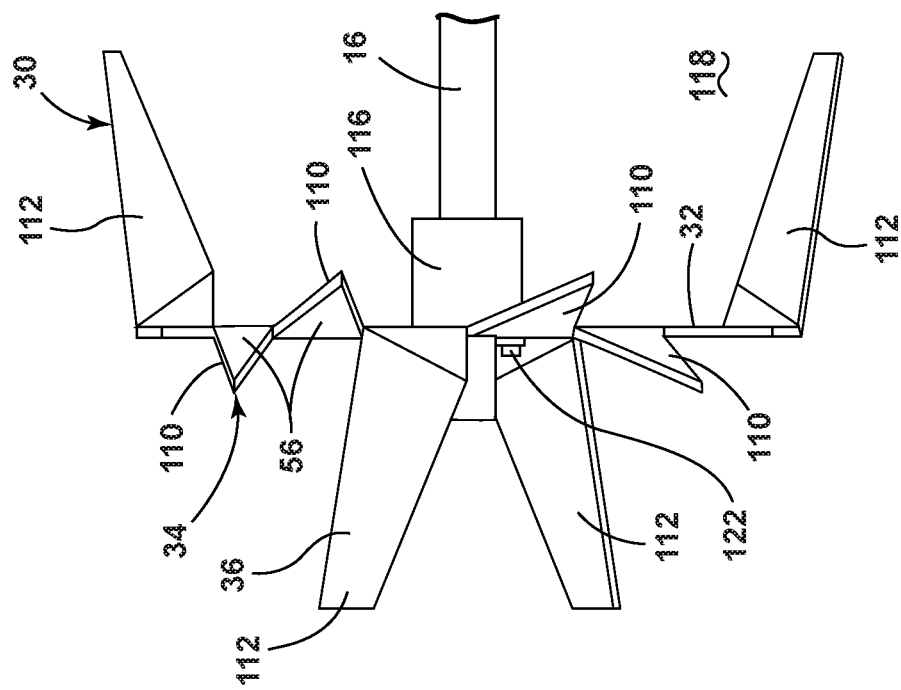
FIG. 11 is a front perspective view of the ground manipulation device and the shaft, according to various embodiments.
Figure 10:
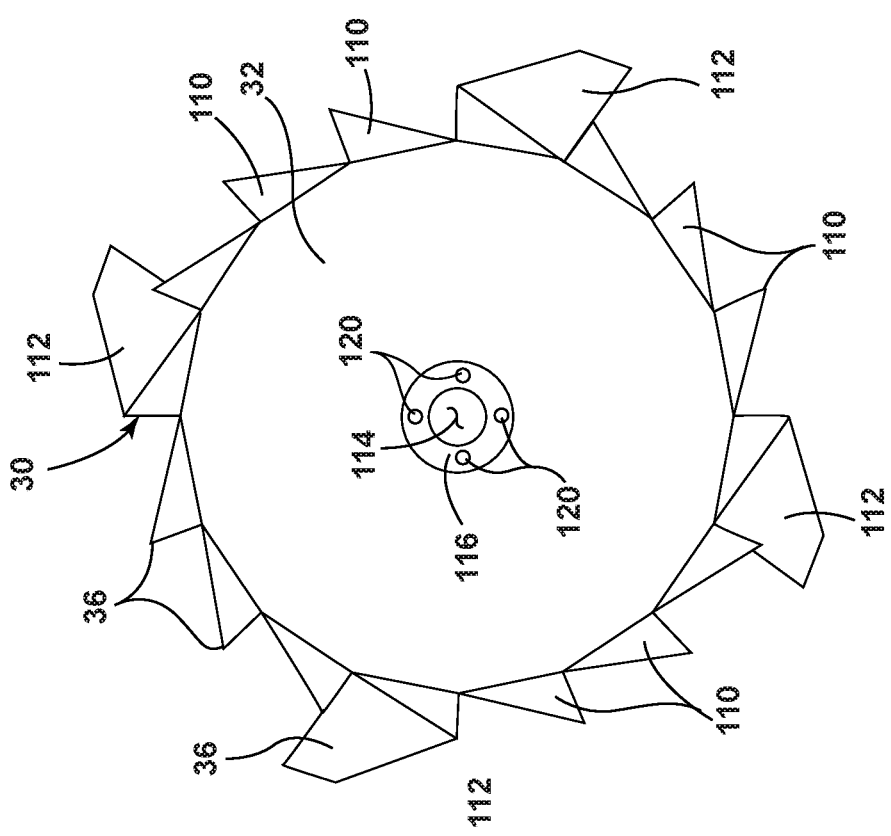
FIG. 10 is a side perspective view of the ground manipulation device, according to various embodiments.

Referring to FIGS. 10 and 11, working assembly 12 further includes two ground manipulation devices 30, 31 removably attached to the first shaft 16 and the second shaft 20, respectively. Each ground manipulation device 30, 31 has a planar section 32 that extends substantially perpendicular to the first and second shafts 16, 20, and an outer engaging edge 34 having a plurality of irregularities 36 spaced there along. Each ground manipulation device 30, 31 is removably fixed to its respective shaft 16, 20 by any method known in the art, such as through the usage of fasteners 122. The irregularities 36 include a series of saw-blade like teeth 110 that are bent alternately to both sides of the planar section 32. Interspersed between the bent teeth 110 are digging arms 112 that extend laterally beyond the alternating bending teeth 110.

The planar section 32 further defines a center hole 114 and a hub 116. The first or second shafts 16, 20 are disposed through the hole 114 and hub 116. The ground manipulation devices 30, 31 are attached to the hubs 116 through fasteners 122 that are disposed within fastener holes 120 defined by the planar section 32 of the ground manipulation devices 30, 31. Therefore, as the first and second shafts 16, 20 rotate the teeth 110 slice into a ground soil 118 and the digging arms 112 penetrate and widen further into the ground soil 118. The ground manipulation devices 30, 31 are removably fixed on the shafts 16, 20 and the length of the shafts 16, 20 can vary as to provide the maximal ground coverage. For example, as shown in FIG. 6, the ground manipulation devices 30, 31 can be spaced apart with the first ground manipulation device 30 on the first shaft 16 closer to the frame 14 than the second ground manipulation device 31 on the second shaft 20. Therefore, there is lateral overlapping between the first and second ground manipulation devices, 30, 31 on either side of frame 14. The overlapping will help to reduce the total length of the working assembly 12, making it more maneuverable in tight corners. Lateral overlapping will also help to avoid the clear the debris jams between the ground manipulation devices 30, 31 and the frame 14. Further, equal and adequate lateral spacing is provided between the ground manipulation devices 30, 31 with enough space from each other or any parts of the gardening system 10. Furthermore, for tilling and weeding at the same time, the ground manipulation devices 30, 31 will carry the second shearing blade 106 that works cooperatively with the first shearing blade 102 fixed on the frame 14, as shown in FIG. 2.

To work, the machine can be coupled to an engine 48 or power source. For example, a large version of this machine can be driven by the engine 48 of a lawn/garden tractor. Still larger version with extended shafts 16, 20 and a multiple number of the ground manipulation devices 30, 31 and/or other ground working devices 30, 31 can be driven by a farm tractor or an engine 48 of equivalent power for tilling of fields. Conversely, a small version of the machine can be driven by a small hand-held engine 48 or power source.

A variety of advantages may be derived from the use of the present disclosure. For example, use of the gardening system disclosed herein provides a unique machine capable of moving hard dirt and/or heavy weed simultaneously. Moreover, the gardening system may include a release system to further assist in preventing debris from jamming the gardening system, which may increase the perceived value of the gardening system. Lastly, the unique ground manipulation device provided herein may perform various functions simultaneously to reduce the time needed to alter a ground surface upon which the gardening system is used.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A gardening system, comprising:
a frame having first and second sidewalls;
a first shaft mounted within the frame for rotation in a first direction and extending through the first and second sidewalls;
a second shaft mounted within the frame for rotation in a second direction, which is opposite to the first direction, the second shaft extending through the first and second sidewalls;
a drive system operably coupled to the first and second shafts for driving the first shaft in the first direction and the second shaft in the second direction;
a first ground manipulation device attached to the first shaft, the first ground manipulation device having a planar section extending substantially perpendicular to the first shaft and an outer engaging edge having a first plurality of irregularities; and
a second ground manipulation device attached to the second shaft, the second ground manipulation device having a planar section extending substantially perpendicular to the second shaft and an outer engaging edge having a second plurality of irregularities, wherein each of the first and second ground manipulation devices includes a plurality of teeth and a plurality of arms, the plurality arms extending further outward from a planar portion than the plurality of teeth.

2. The gardening system of claim 1, wherein the drive system comprises:

an engine;
a first gear coupled to the first shaft;
a second gear coupled to the second shaft; and
a drive shaft that engages with the engine and the first and second gears such that rotation of the drive shaft by the engine results in rotation of the first and second shafts.

3. The gardening system of claim 2, wherein the first and second shafts counter-rotate relative to one another as a result of rotation of the drive shaft.

4. The gardening system of claim 1, further comprising:
a release system disposed within the drive system to reduce or reverse the rotation of the first and second shafts when debris is disposed between the first and second ground manipulation devices, wherein the release system is formed from a first portion and a second portion of the drive system, the second portion having a worm portion and the second portion defining a chamber that is disposed above the worm portion.

5. The gardening system of claim 4, wherein a midsection of the chamber includes a partition that divides the chamber into an upper chamber and a lower chamber and defines a partition hole.

6. The gardening system of claim 1, further comprising:
a first shearing blade fixedly coupled to each of the first and second sidewalls of the frame and extending outwardly from the corresponding sidewall of the frame; and
a second shearing blade on the first and second ground manipulation devices.

7. The gardening system of claim 1, wherein the first ground manipulation device on the first shaft is closer to the frame than the second ground manipulation device on the second shaft, the first ground manipulation device on the first shaft laterally overlapping with the second ground manipulation device on the second shaft.

8. The gardening system of claim 4, further comprising:
a pin disposed on a bottom portion of the first portion of the drive system, the pin having a length that is less than an internal width of the chamber; and
a corresponding recession slot in the second portion of the drive system, wherein the pin and slot engage one another to rotate the first and second portions of the drive system simultaneously.

9. The gardening system of claim 1, wherein each of the plurality of teeth extend in opposing directions from the planar portion from each adjacently disposed tooth and each of the plurality of arms extends in opposing directions from the planar portion from each adjacently disposed arm.

10. The gardening system of claim 4, wherein the worm portion is engaged with first and second worm gears, the first and second worm gears configured to rotate the first and second shafts in opposing directions.

11. A gardening system, comprising:
a frame having first and second sidewalls;
a drive system operably coupled to first and second shafts for driving the first shaft in a first direction and the second shaft in a second direction, the first and second shafts each extending through the first and second sidewalls of the frame;
a first pair of ground manipulation devices attached to either end of the first shaft such that a first end of the first shaft is provided with one of the first ground manipulation devices and a second end of the first shaft is provided with one of the first ground manipulation devices;
a second pair of ground manipulation devices attached to either end of the second shaft such that a first end of the second shaft is provided with one of the second ground manipulation devices and a second end of the second shaft is provided with one of the second ground manipulation devices;
a release system disposed within the drive system to reverse a direction of rotation of the first and second shafts, wherein the release system is formed from a first portion and a second portion of the drive system;
a chamber defined by the second portion of the drive system;
a partition that divides the chamber into an upper chamber and a lower chamber;
a pin disposed on a bottom portion of the first portion of the drive system, the pin having a length that is less than a width of the chamber; and
a corresponding recession slot disposed in the second portion of the drive system, wherein the pin and slot engage one another to rotate the first and second portions of the drive system simultaneously.

12. The gardening system of claim 11, wherein the first portion of the drive system is disposed within the upper chamber, a hole defined by the partition, and the lower chamber of the second portion, and wherein the first portion includes a first threaded portion having male screw threads.

13. The gardening system of claim 12, wherein the partition includes a second threaded portion having female screw threads that correspond with the male screw threads.

14. The gardening system of claim 13, wherein the male screw threads of the first portion and the female screw threads of the second portion are driven to interact upon the drive system experiencing a torque that exceeds a predetermined threshold, and wherein the interaction between the male screw threads and the female screw threads effects the reversal in the direction of rotation of the first and second shafts.

15. A gardening system, comprising:
a drive shaft operably coupled to first and second shafts for driving the first shaft in a first direction and the second shaft in a second direction;
a first ground manipulation device attached to the first shaft;
a second ground manipulation device attached to the second shaft, the first and second ground manipulation devices include a plurality of teeth and a plurality of long arms, the plurality of long arms extending further outward from a planar portion than the plurality of teeth; and
a release system disposed within the drive shaft to reduce or reverse a rotation of the first and second shafts, wherein the release system is formed from a first portion and a second portion of the drive shaft.

16. The gardening system of claim 15, wherein the second portion has a worm portion and the second portion defines a chamber that is disposed above the worm portion and a midsection of the chamber includes a partition that divides the chamber into an upper chamber and a lower chamber.

17. The gardening system of claim 16, wherein the first portion of the drive shaft is disposed within the upper chamber, a hole defined by the partition, and the lower chamber and wherein the first portion includes a first section having male screw threads.

18. The gardening system of claim 15, further comprising:
first and second threaded portions having threads that correspond with one another;
a pin disposed on a bottom portion of the first portion of the drive shaft, the pin having a length that is less than a width of the chamber; and a corresponding recession slot in the second portion of the drive shaft, wherein the pin and the recession slot engage one another to rotate the first and second portions of the drive shaft simultaneously, wherein the pin disengages the recession slot when the first and second threaded portions mate.

19. A gardening system, comprising:

a frame having first and second sidewalls;

a first shaft mounted within the frame for rotation in a first direction and extending through the first and second sidewalls;

a second shaft mounted within the frame for rotation in a second direction, which is opposite to the first direction, the second shaft extending through the first and second sidewalls;

a drive system operably coupled to the first and second shafts for driving the first shaft in the first direction and the second shaft in the second direction;

a first ground manipulation device attached to the first shaft, the first ground manipulation device having a planar section extending substantially perpendicular to the first shaft and an outer engaging edge having a first plurality of irregularities;

a second ground manipulation device attached to the second shaft, the second ground manipulation device having a planar section extending substantially perpendicular to the second shaft and an outer engaging edge having a second plurality of irregularities;

a first shearing blade fixedly coupled to each of the first and second sidewalls of the frame and extending outwardly from the corresponding sidewall of the frame; and a second shearing blade on the first and second ground manipulation devices.

20. The gardening system of claim 19, wherein each of the first and second ground manipulation devices includes a plurality of teeth and a plurality of arms, the plurality arms extending further outward from a planar portion than the plurality of teeth.

21. The gardening system of claim 20, wherein each of the plurality of teeth extend in opposing directions from the planar portion from each adjacently disposed tooth and each of the plurality of arms extends in opposing directions from the planar portion from each adjacently disposed arm.

22. The gardening system of claim 19, wherein the first ground manipulation device is attached to an end of the first shaft, wherein the second ground manipulation device is attached to an end of the second shaft, wherein the first ground manipulation device on the first shaft is closer to the frame than the second ground manipulation device on the second shaft, and the first ground manipulation device on the first shaft laterally overlaps with the second ground manipulation device on the second shaft.

23. The gardening system of claim 19, wherein the drive system comprises:

an engine;

a first gear coupled to the first shaft;

a second gear coupled to the second shaft; and a drive shaft that engages with the engine and the first and second gears such that rotation of the drive shaft by the engine results in rotation of the first and second shafts.

* * * * *